(12) United States Patent
Gulrajani et al.

(10) Patent No.: US 11,362,949 B2
(45) Date of Patent: Jun. 14, 2022

(54) PATH COUNT MANAGEMENT

(71) Applicant: Cisco Technology, Inc., San Jose, CA (US)

(72) Inventors: Sameer Gulrajani, Fremont, CA (US); Swadesh Agrawal, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 56 days.

(21) Appl. No.: 16/891,035

(22) Filed: Jun. 2, 2020

(65) Prior Publication Data

US 2021/0377174 A1 Dec. 2, 2021

(51) Int. Cl.
*H04L 5/00* (2006.01)
*H04L 45/748* (2022.01)
*H04L 47/125* (2022.01)
*H04L 45/00* (2022.01)

(52) U.S. Cl.
CPC ............ *H04L 45/748* (2013.01); *H04L 45/20* (2013.01); *H04L 45/22* (2013.01); *H04L 47/125* (2013.01)

(58) Field of Classification Search
CPC ....... H04L 45/748; H04L 45/20; H04L 45/22; H04L 47/125
See application file for complete search history.

(56) References Cited

U.S. PATENT DOCUMENTS

| | | | | |
|---|---|---|---|---|
| 10,623,322 | B1* | 4/2020 | Nallamothu | H04L 47/20 |
| 2004/0085911 | A1* | 5/2004 | Castelino | H04L 43/50 |
| | | | | 370/252 |
| 2005/0147051 | A1* | 7/2005 | Suri | H04L 45/00 |
| | | | | 370/249 |
| 2006/0209851 | A1* | 9/2006 | Scudder | H04L 45/22 |
| | | | | 370/401 |
| 2006/0233181 | A1* | 10/2006 | Raszuk | H04L 45/02 |
| | | | | 370/401 |
| 2012/0093166 | A1* | 4/2012 | Rosenberg | H04L 45/02 |
| | | | | 370/401 |
| 2013/0308468 | A1* | 11/2013 | Cowie | G06F 30/20 |
| | | | | 370/248 |
| 2015/0092785 | A1* | 4/2015 | Torvi | H04L 45/02 |
| | | | | 370/401 |
| 2019/0179668 | A1* | 6/2019 | Wang | H04L 45/74 |

* cited by examiner

*Primary Examiner* — Abdelnabi O Musa
(74) *Attorney, Agent, or Firm* — Lee & Hayes, P.C.

(57) ABSTRACT

This disclosure describes techniques for managing path counts at a router. The techniques include monitoring available storage space at a router for storing per prefix routes. In an instance where the available storage space at the router may be inadequate to support continued, stable network operations, the techniques include reducing an amount of per prefix routes that are advertised to the router. The techniques may also include withdrawing previously advertised per prefix routes from the router. As such, path count management concepts may help prevent overload of storage space at a router.

20 Claims, 11 Drawing Sheets

PATH COUNT MANAGEMENT

TECHNICAL FIELD

The present disclosure relates generally to managing path counts on routers in a computing network, thereby improving overall performance of the computing network.

BACKGROUND

Network environments are growing in complexity and scale to handle the ever-increasing demands on computer systems in the modern world. In one example, designers and managers of computing networks are adding redundancy by replacing single, large-core routers with spine/leaf topologies, which may be comprised of smaller form factor devices, such as smaller routers. The spine/leaf topology offers an efficient and scalable communication architecture to a data center environment. Benefits of a spine/leaf topology can include increased redundancy and opportunities for load balancing of data traffic, for instance. However, since generally every "spine" router is connected to every "leaf" router, the spine/leaf topology presents a complex mesh of potential connections to destination prefixes. To achieve the redundancy and/or load balancing-type benefits of spine/leaf topology, typically border gateway protocol (BGP) additional-paths are used to advertise multiple paths (e.g., nexthops) for each prefix. Thus, the complex spine/leaf topology can result in an explosion in the potential path counts that would need to be maintained on each of the smaller routers, which may easily exceed the memory available. Stated another way, smaller routers or other devices may not be capable of storing all the redundant paths provided for each prefix.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

Figure 1A:
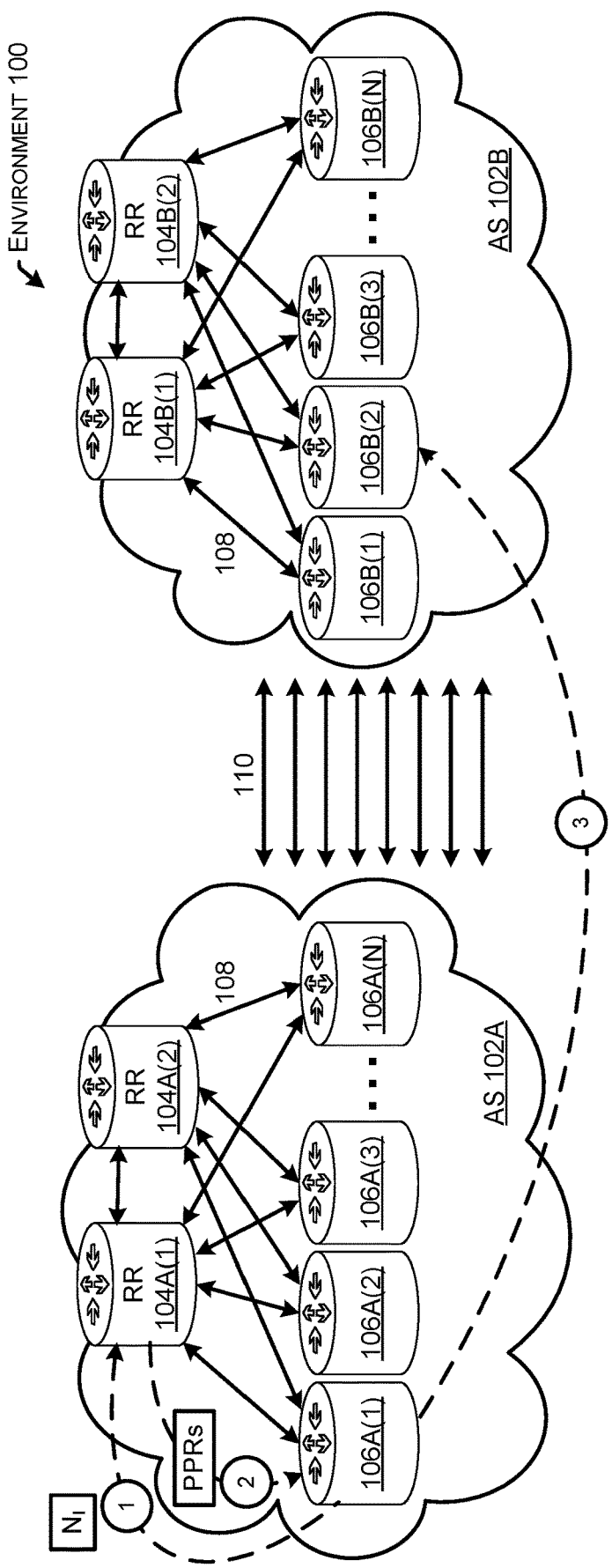
FIGS. 1A-2C illustrate component diagrams with example environments in which path count management techniques may be employed as part of communications between network devices, in accordance with the present concepts.

This disclosure describes, at least in part, a method that may be implemented by a router communicatively coupled to a route reflector. The method may include receiving, at a router and from a route reflector, an initial number of per prefix routes (e.g., paths to a destination). The method may include monitoring an available storage space of the router for storing the per prefix routes. Based at least in part on the available storage space of the router, the method may include determining an adjusted number for the per prefix routes. The method may also include sending, to the route reflector, an indication of the adjusted number for the per prefix routes. In response to sending the indication of the adjusted number, the method may include receiving, from the route reflector, a subsequent number of the per prefix routes, where the subsequent number complies with the adjusted number.

This disclosure also describes, at least in part, a method that may be implemented by a route reflector of a network, the route reflector communicatively coupled to a router of the network. The method may include receiving, at a route reflector of a network, an indication that a router of the network has limited available storage space for storing per prefix routes. Responsive to the indication that the router has limited available storage space, the method may also include sending a limited amount of the per prefix routes to the router from the route reflector, the limited amount being lower than a previous amount of the per prefix routes sent to the router from the route reflector.

Additionally, the techniques described herein may be performed by a system and/or device having non-transitory computer-readable media storing computer-executable instructions that, when executed by one or more processors, performs the method described above.

Example Embodiments

This disclosure describes techniques for preventing overload of memory-constrained devices. One technique for preventing overload of a memory-constrained device, such as a router (e.g., edge router, edge device, server), may include managing the number of per prefix routes (e.g., routes, paths to a destination, next hops) maintained in storage space of the router. The number of per prefix routes maintained on the router may be referred to as a path count of the router. In some examples, the path count may be held steady or reduced by adjusting a number of additional paths (e.g., add paths, routes) advertised to the router. Stated another way, a lower number of per prefix route choices may be offered to a router to prevent overload of the storage space on the router. Additionally, per prefix routes that were previously advertised to the router may be withdrawn. In some examples, the router may be able to provide an update regarding its available storage space to adjust a number of per prefix routes the router receives and/or maintains. In this manner, the path count management techniques described herein may help prevent overload of routers and the potential undesired consequences for network operations.

In some computer networking environments employing a spine/leaf topology, route reflectors may be used to lower an overall number of border gateway protocol (BGP) peerings within an autonomous system (AS). A route reflector may offer an option of multiple next hops per prefix by advertising multiple per prefix routes to neighboring routers and/or other devices, such as servers, firewalls, load balancers, etc. The receiving router now has multiple options to reach a destination prefix. The multiple per prefix route options provide redundancy (e.g., quicker convergence times on failures) and/or may be used to load balance traffic to a destination across the various routes. In some network topologies, 8-16 and potentially more alternate routes may be advertised, for example. However, as the prefix scale increases, the memory requirements on the receiving routers to store the per prefix routes also increase.

An individual router may not have sufficient available storage space (e.g., memory capacity) to handle a relatively large amount of extra per prefix routes. Spine/leaf topology can typically feature a larger array of smaller form factor devices, such as smaller routers. Although the larger array is advantageous in terms of architectural flexibility, the smaller routers may have relatively little available storage space. As the scale of prefixes grows, the internal state of any given router that may be needed to store the per prefix routes keeps increasing as well. Once a router runs out of memory, there can be severe undesired consequences in the computing network. Maxing out the memory on a router can leading to service interruptions, for instance. Conversely, not employing the technique of advertising add paths would mean the redundancy/load balancing benefits of the spine/leaf topology are lost. Therefore, network operations may benefit from a more efficient method of managing the path count at any given router, particularly within a computing network featuring a spine/leaf topology. A route reflector may help to control how many per prefix routes are advertised to any given router in a manner that manages the path count on the router.

In some examples, a router may signal a number "N" of per prefix routes that the router wishes to receive from the route reflector to be able to send traffic to a particular destination. The number may be an initial number of per prefix routes that the router is able to maintain in available storage space, and/or may reflect a general memory capacity of the router. In some cases, the route reflector may have knowledge of a memory capacity for the model of the router in question. In some cases the route reflector may be programmed with an initial number of per prefix routes to send to a router. As network operations proceed and an overall scale of advertised and/or used operating routes remains relatively low, available storage space at any particular router may not be a concern, and no further action may be taken regarding per prefix routes to ensure continued acceptable network operations.

As the overall scale of network operations increases, the number of per prefix routes advertised to the router by the route reflector may benefit from management to prevent overload of the router. The number of per prefix routes may be adjusted based on a changing available storage space of the router, for example. For a router that is almost out of memory capacity, the number of per prefix routes advertised from the route reflector to the router may be reduced. In some examples, the router may send a message (e.g., update) to the route reflector. For example, the router may send a message to the route reflector that includes an indication of available storage space at the router. The message may be sent as a BGP update, sent via telemetry, and/or sent by any of a variety of direct or indirect delivery options. In some implementations, the message may provide an adjusted number "N" of per prefix routes that the router wishes to receive from the route reflector. The router may send the message when it is consuming close to its maximum available storage space, for instance. In response to the message with the adjusted number of per prefix routes, the route reflector may reduce the number of per prefix routes advertised to the router based on the adjusted number from the router. Additionally or alternatively, in response to the message the route reflector may withdraw at least some per prefix routes from the router. Reducing a number of advertised per prefix routes and/or withdrawing a per prefix route(s) from a router may free up some memory on the router experiencing low memory conditions. In this manner, the path count at the router may be managed to prevent an overload on memory/storage space.

In some examples, decreasing a number of per prefix routes maintained at individual routers may allow the computing network to take part in the redundancy, load balancing, and/or other advantages of the spine/leaf topology while proceeding with a stable operation. A router may ratchet down the number "N" of per prefix routes more than once. For instance, where the route scale of the overall computing network operation increases and/or memory of the router becomes constrained again, the router may signal a new "N" to the route reflector, once again adjusting the path count on the router. Note that a threshold change and/or number value may be used to prevent churn in the form of excessive updates being sent from the router to the route reflector. A threshold and/or number value may also be used to prevent excessive changes in advertisements or withdrawal actions on the part of the route reflector, another potential source of churn. For instance, the router may be programmed to only send a message to the route reflector regarding an adjusted number of per prefix routes when a threshold change in available storage space has occurred. In another example, the route reflector may be programmed to send a new number of per prefix routes and/or withdraw per prefix routes when adjusted number in a message from a router is a threshold difference from a current and/or initial number of per prefix routes associated with the router.

In some implementations, in order to advertise a lower number of paths, the route reflector may reduce the number of destinations (or extended communities) for which it advertises per prefix routes to the router. For example, there are some instances where limits to per prefix routes may not be appropriate. In some cases, a service provider may intend to provide a guaranteed service, or some other service priority, to a particular client. However, dropping below a specified limit on a number of per prefix routes may result in poor service, such as bringing down a BGP session. Therefore, the service provider may not be able to limit a number of per prefix routes associated with a client service, in order to fulfill the obligation of the prioritized service. In some cases, a service provider offering higher priority to certain traffic can tag high priority prefixes with certain extended communities. For example, the service provider may sell multiple tiers of service such as Low, Medium, and High priorities, and each tier may have a separate extended community assigned to the relevant prefixes.

When a receiving router in the service provider network starts to run low on available storage space, the router may send out message to the route reflector. The message may signal to the route reflector that the router is low on available storage space. The message may also provide additional information to the route reflector. For example, the message may contain a list of extended communities that the router would like to receive. In the example of the Low, Medium, and High priorities of service introduced above, in a first instance where all three tiers are requested in a message, the route reflector may withdraw all prefixes that are not associated with the extended communities that correspond to the Low, Medium, and High priorities. In a second instance, if a further low memory condition occurs at the router, the router may send another message excluding the extended community for the Low priority service, for instance. In response, the route reflector may withdraw any per prefix routes associated with the Low priority service. In this manner, the path count on the router may be reduced, and the available storage space on the router is preserved for the relatively higher priority service clients.

In some cases, the available storage space at a router may return to a less-impacted state. In a case where the memory of a router is no longer in danger of being overloaded, an adjusted number of per prefix routes sent from a router to a route reflector may be withdrawn. Withdrawing an adjusted number may result in the route reflector reverting to advertising a previous and/or initial number of per prefix routes to the router, and/or reverting to advertising per prefix routes for all original destinations or extended communities. Withdrawing an adjusted number may also result in the route reflector once again advertising any previously withdrawn per prefix routes to the router. Withdrawing an adjusted number may also result in the route reflector reverting to advertising a pre-programmed, default, or otherwise predetermined number of per prefix routes to the router.

To summarize, the increasing complexity and scale of network operations can benefit from the redundancy, load balancing, and other potential benefits of a spine/leaf topology using route reflectors to control per prefix route advertisement to individual routers. However, techniques for managing paths counts on the routers are needed to prevent undesired consequences where the routers may run out of memory capacity. Therefore, network operations may be improved with a more efficient technique for managing a path count on any given router, particularly in a network with a spine/leaf topology.

Although the examples described herein may refer to router(s) and/or route reflector(s) in a spine/leaf topology, at least some of the techniques can generally be applied to any device in a network. For example, path count management concepts may be extended to other scenarios such limited resource events in the forwarding plane (e.g., linecards running out of ternary content addressable memory (TCAM)). In another example, for systems which may have limited equal-cost multi-path routing (ECMP) forwarding equivalence classes (FECs), a message may be sent to a route reflector to advertise a primary and a backup route, and perhaps less or potentially no ECMP routes. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIGS. 1A-1D collectively illustrate an example environment 100 in accordance with the present path count management concepts. Example environment 100 may include one or more autonomous systems (ASs) 102 (e.g., computing networks). In FIGS. 1A-1D, two ASs 102 are shown, including AS 102A and AS 102B. The use of the same reference numbers in different figures indicates similar or identical items. In some cases, letters (e.g., "A" and "B") and/or parentheticals are utilized after a reference number to distinguish like elements. Use of the reference number without the associated letter and/or parenthetical is generic to the element. An AS 102 may include one or more route reflectors (RRs) 104 and one or more routers 106 (e.g., servers, devices), and/or other computing devices. Various types of computing devices are contemplated for the elements of an AS 102, including a computer, server, border device, endpoint device, laptop, mobile device, tablet, etc. A router 106 may be a server and/or or other type of network device that is configured to provide data and/or network services to a user device.

In example environment 100, a route reflector(s) 104 of an AS 102 may be communicatively coupled to various router (s) 106 and/or other devices within an AS 102. Within the example environment 100, the route reflector(s) 104, router (s) 106, and/or other devices may exchange communications (e.g., packets) via a network connection(s), indicated by double arrows 108 in FIGS. 1A-1D. For instance, network connections 108 may be transport control protocol (TCP) network connections, border gateway protocol (BGP) connections, or any network connection (e.g., information-centric networking (ICN)) that enables the route reflector(s) 104, router(s) 106, and/or other devices to communicate and/or to exchange packets. The network connections 108 represent, for example, data paths between the devices. It should be appreciated that the term "network connection" may also be referred to as a "network path." In some examples, the network connections may be viewed as control plane communications between the route reflector(s) 104 and the router(s) 106.

Also in example environment 100, devices of AS 102A may communicate with devices of AS 102B via a network connection(s), indicated by double arrows 110. Although eight double arrows are shown, the precise number is not meant to be limiting. The network connection(s) 110 may represent any number of transport control protocol (TCP) network connections, border gateway protocol (BGP) connections, or any network connection (e.g., information-centric networking (ICN)) that enables the route reflector(s) 104, router(s) 106, and/or other devices of the ASs 102 to communicate and/or to exchange packets. For instance, the network connection(s) 110 may represent the internet. The network connection(s) 110 may represent data plane communications. The network connection(s) 110 may represent per prefix routes used to transport data traffic from a device of AS 102A to AS 102B or vice versa, for instance. The use of an AS and/or a cloud computing network in this example is not meant to be limiting. Other types of networks are contemplated in accordance with path count management concepts. Not all potential network connections are shown in FIGS. 1A-1D to avoid clutter on the drawing page.

FIGS. 1A-1D collectively illustrate example scenarios that include communications between router 106A(1), route reflector 104A(1), and other devices of environment 100. The communications are indicated with dashed, numbered lines. For example, referring to FIG. 1A, at "Step 1," router 106A(1) may send a message signaling an initial number "$N_I$" to route reflector 104A(1), indicating a number of per prefix routes router 106A(1) wishes to receive in order to communicate with a prefix. The number may or may not be associated with any particular destination or extended community. For instance, the number may simply correspond to an amount of memory available at the router. For purposes of illustration, the initial number in this example scenario is eight. In this example, router 106A(1) wishes to communicate with router 106B(2) in AS 102B. Note that in some implementations, the initial number is not necessarily sent from a router 106 to a route reflector 104. The initial number may pre-programmed and/or configured in route reflector 104A(1) and/or another device in the system. The initial number may be a default number of per prefix routes for a route reflector 104 to supply to any given router 106, for instance. In some examples, a route reflector 104 may be configured to send a number of per prefix routes to a router 106 based on a model of the router 106, which may have a known and/or expected memory capacity for per prefix routes.

At "Step 2" in FIG. 1A, in some cases, route reflector 104A(1) may advertise per prefix routes (PPRs) to router 106A(1). The amount of the per prefix routes may comply with the initial number requested by and/or configured for router 106A(1). Therefore, route reflector 104A(1) may send information regarding eight per prefix routes to router 106A(1). In this instance, the destination for the eight per prefix routes is router 106B(2) and/or extended communities associated with router 106B(2).

At "Step 3" in FIG. 1A, router 106A(1) may send data traffic to router 106B(2). Network connections 110 may be viewed as the eight per prefix routes available to router 106A(1) to transport the data traffic to router 106B(2), in this scenario. Thus, router 106A(1) may use one or more of the network connections 110 to transport the data traffic to router 106B(2), including the use of various techniques that use multiple connections, such as load balancing, stream splitting, redundancy, etc. As network operations continue, router 106A(1) may monitor memory capacity for storing per prefix routes. As long as available storage space is sufficient, no further action may be needed from router 106A(1) to continue to participate in communications with other devices in the system. However, as an overall route scale of the system increases, router 106A(1) may determine that available storage space is, or will become insufficient. Furthermore, router 106A(1) may determine an adjusted number of per prefix routes from route reflector 104A(1) that would ensure continued stable operation of router 106A(1).

Figure 1B:
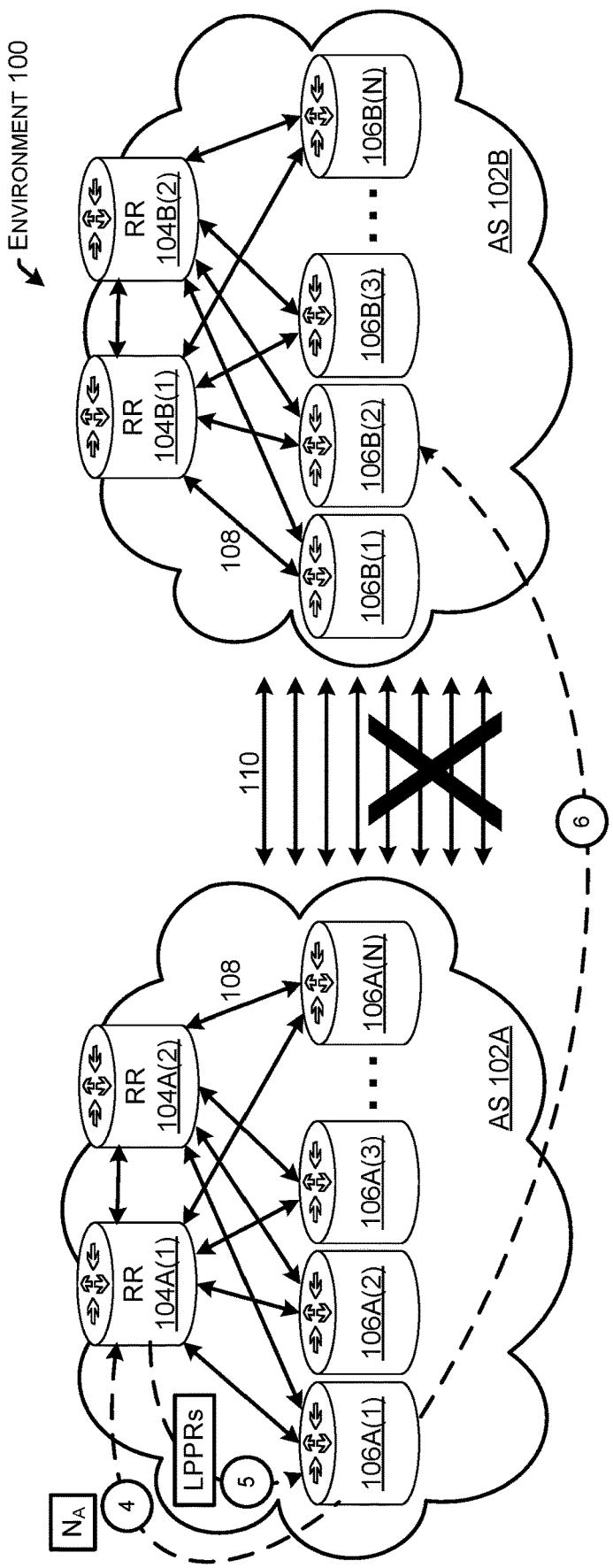

At "Step 4" in FIG. 1B, may send a message signaling the adjusted number "$N_A$" to route reflector 104A(1), indicating a new, updated number of per prefix routes router 106A(1) wishes to receive in order to communicate with any prefix, and/or specifically with router 106B(2). The adjusted number may correspond to a particular value, may indicate an amount of available storage space at router 106A(1), may indicate a difference from the initial number, or may represent any of a variety of schemes for reducing and/or limiting the initial number of per prefix routes. In some implementations, a threshold value for available storage space may be used to trigger a message signaling an adjusted number. The memory utilization threshold may be a default value, a predetermined value, configured by a network operator, related to a percentage of memory utilization at the router, etc.

In some implementations, router 106A(1) and route reflector 104A(1) may participate in a capability negotiation to ensure both devices support path count management procedures involving the messaging for an adjusted number of per prefix routes. The capability negotiation can ensure that the message employed by router 106A(1) to signal the number of per prefix routes requested will be read and/or understood by route reflector 104A(1). Further, router 106A(1) may be aware of how many per prefix routes may be withheld in response to sending the message. Therefore router 106A(1) has capability to be as aggressive as needed to come out of the low memory condition. Any of a variety of formats are contemplated for the message from router 106A(1) to be signaled to route reflector 104A(1), including a BGP message and non BGP mechanisms (e.g., telemetry). Note that path count management messages may be sent by small form factor, memory limited devices (e.g., routers 106) and consumed by route reflectors 104. Other devices in a computing network, particularly devices that do not have memory constraints, do not necessarily need to understand the path count management messages or associated protocols since the messages may not be propagated to other devices.

At "Step 5" in FIG. 1B, route reflector 104A(1) may advertise an updated amount of per prefix routes, such as limited per prefix routes (LPPRs), to router 106A(1). Responsive to the message from router 106A(1) in Step 4, the amount (e.g., subsequent number) of the per prefix routes may comply with the adjusted number requested by router 106A(1). Therefore, route reflector 104A(1) may send information regarding less than eight per prefix routes to router 106A(1). For purposes of illustration, the adjusted number in this example scenario is four. The reduction in per prefix routes available to router 106A(1) is represented by an "X" over four of the network connections 110, leaving four unmarked, available network connections 110. In some cases, the subsequent number of per prefix routes may not match the adjusted number sent in the message, as long as the subsequent number complies with (e.g., is less than) the adjusted number. Note that route reflector 104A(1) may communicate with another device, such as route reflector 104B(1), to collect information that may help route reflector 104A(1) determine which per prefix routes to advertise. Such communications between route reflectors 104 may happen at various points in the example scenarios depicted in FIGS. 1A-2C, but are not shown to avoid clutter on the drawing pages. For instance, communications between route reflectors may include establishing pre-programmed or configured routes, numbers of routes, addresses, etc.

At "Step 6" in FIG. 1B, router 106A(1) may send data traffic to router 106B(2) using one or more of the four available network connections 110 to transport the data traffic to router 106B(2). Although the overall number of per prefix routes has been limited, multiple per prefix routes are still available for router 106A(1) to transport data traffic in this scenario. Therefore, load balancing, redundancy, or other techniques that utilize multiple connections may still be employed. Note that where the overall route scale of the system increases and memory becomes constrained again, router 106A(1) may signal a new adjusted number to route reflector 104A(1), receive a more limited number of per prefix routes, and continue communicating with router 106B

(2) and/or other devices. Furthermore, a message for a new adjusted number may be triggered by the router 106A(1) passing another threshold in memory utilization, for instance.

Figure 1C:
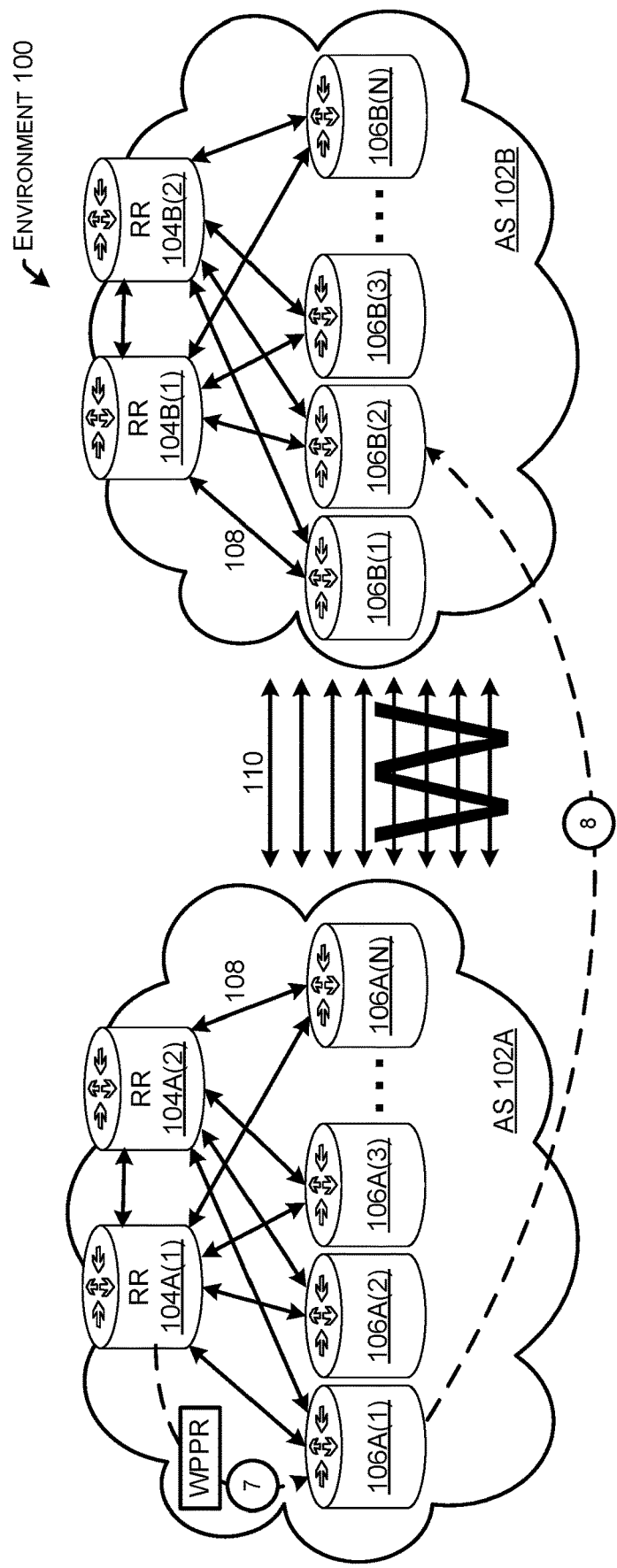

At "Step 7" in FIG. 1C, route reflector 104A(1) may withdraw per prefix routes (WPPR) from router 106A(1). As used herein, "withdrawing" per prefix routes from a router 106 refers to making particular per prefix routes that were previously advertised to a router 106 unavailable for use by that router 106. In contrast, Step 5 refers to simply advertising a lower number of per prefix routes to a router 106. In some cases, Steps 5 and 7 are accomplished concurrently. For example, in response to a message from a router 106 indicating an adjusted number of per prefix routes, a route reflector 104 may advertise a new set of per prefix routes which is lower than an initial number of per prefix routes and specifies some routes that the router 106 was previously allowed to use for data traffic, but also leaves out other particular routes that the router was previously allowed to use. Therefore the routes that are left out are withdrawn from the router 106. In FIG. 1C, withdrawn network connections 110 in this scenario are indicated with a large "W." Note that in some scenarios, a reduction in the overall number of advertised routes may not necessarily correspond to, or overlap with, specifically withdrawn routes.

At "Step 8" in FIG. 1C, similar to Step 6 described above, router 106A(1) may send data traffic to router 106B(2) using one or more of the four available network connections 110 to transport the data traffic to router 106B(2).

In general, there may be advantages to a route reflector 104 withdrawing per prefix routes from a router 106. A withdrawal by the route reflector 104 may be in contrast to the router 106 simply deleting a per prefix route from memory, such as to free up or conserve storage space. For example, in an instance where a router 106 deletes a per prefix route for a prefix destination, and then a route reflector 104 coincidentally deletes other per prefix routes for that prefix destination, traffic intended for that prefix destination may not be delivered until the router 106 could sent a route refresh request to the route reflector 104. The traffic may end up in an undeliverable status or "black hole." In contrast, when the route reflector 104 withdraws a per prefix route, the route reflector 104 is able to send an advertisement for an alternative route in the same message, avoiding any delay and/or loss of data traffic, such as data traffic falling into a black hole. In another example, where a router 106 drops a per prefix route, and any of the remaining per prefix routes are withdrawn by the route reflector 104, the router 106 may need to send a route refresh request to the route reflector 104. However, in response to the route refresh request, the route reflector 104 may send the complete per prefix route table to the router 106, even though only one per prefix route was withdrawn. Therefore, the router 106 deleting per prefix routes may lead to message churn and/or unnecessary consumption of bandwidth and other network resources. In a further example, even where selective route refresh is implemented, the resultant messaging overhead (e.g., single route refresh, response from route reflector 104) between the router 106 and route reflector 104 in severe prefix/path churn scenarios presents problems as scale increases. Given that network operations may scale to potentially millions of prefixes, route refresh solutions may produce a bottleneck of network resources. For at least these reasons, and given that the route reflector 104 benefits from a full overlay topology view of the computing network, the route reflector 104 has the ability to make intelligent decisions of which per prefix routes to withdraw when a router 106 is constrained on memory.

Figure 1D:
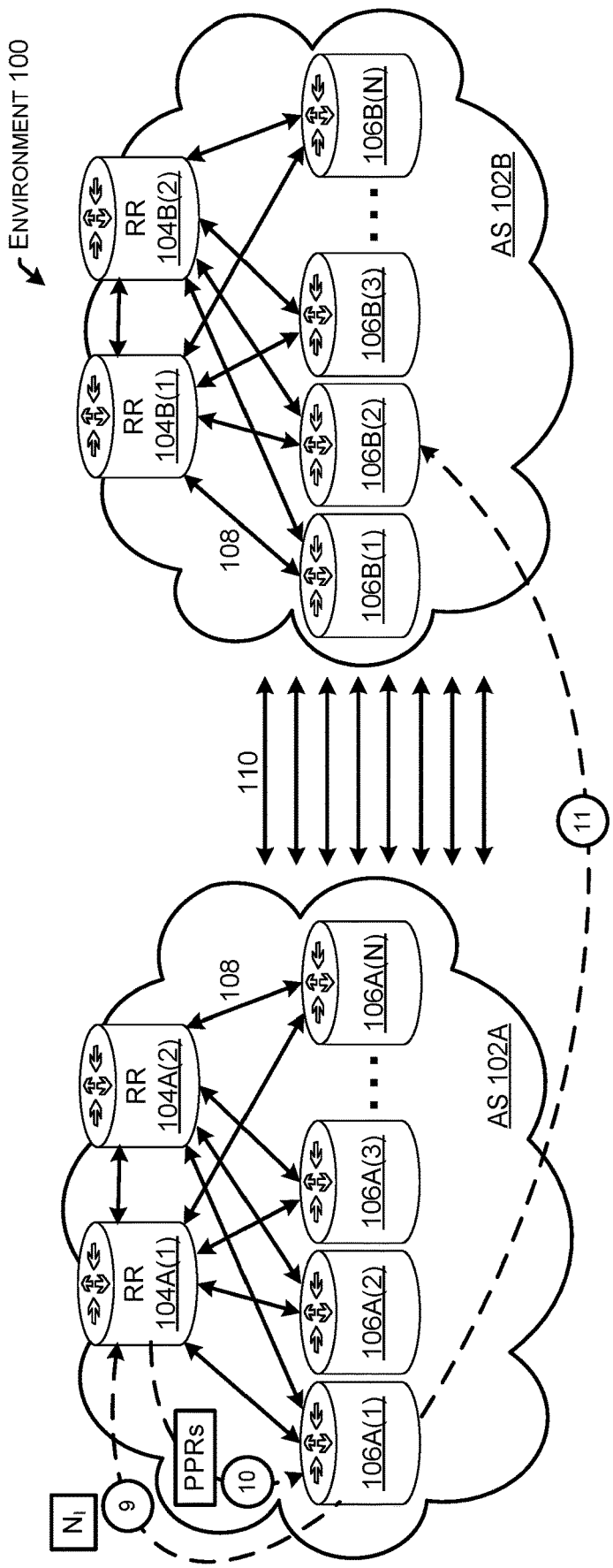

At "Step 9" in FIG. 1D, once the low memory condition on the router 106A(1) has passed, the message with the adjusted number of per prefix routes may be withdrawn. Withdrawing the message may indicate that the router 106A(1) is once again able to receive the initial number "$N_I$" of per prefix routes. In some cases, the router 106A(1) may send a message to the route reflector 104A(1) to indicate that the previous message may be withdrawn, that there is more available storage space, that a higher number of per prefix routes may be advertised to the router 106A(1), etc. Thresholds may be used to when withdrawing a message and/or increasing a number of advertised per prefix routes. For instance, a threshold relating to memory utilization may be used to prevent churn from repeated ratcheting of a number of advertised per prefix routes. In other cases, the message may be withdrawn by user intervention. For instance, a network operator may receive a notice that router 106A(1) is not receiving all potential per prefix routes. The network operator may be able to ensure that the scale has been reduced at router 106A(1), and may withdraw the message with the adjusted number.

At "Step 10" in FIG. 1D, responsive to the message with the adjusted number of per prefix routes having been withdraw, the route reflector 104A(1) may send the initial number of per prefix routes as configured. At "Step 11" in FIG. 1D, router 106A(1) may send data traffic to router 106B(2) using one or more of the eight available network connections 110 to transport the data traffic to router 106B(2). Note that throughout the scenarios shown in FIGS. 1A-1D, service by router 106A(1) to router 106B(2) was not interrupted at any time. Path count management concepts were able to efficiently handle a low memory condition at router 106A(1) through simple communications between two devices, router 106A(1) and route reflector 104A(1). It should also be appreciated that the number and/or order of example Steps shown in FIGS. 1A-1D is not meant to be limiting. More or fewer Steps might be performed than shown in FIGS. 1A-1D and described herein. At least some of the Steps may also be performed in parallel, and/or in a different order than those described herein.

Figure 2A:
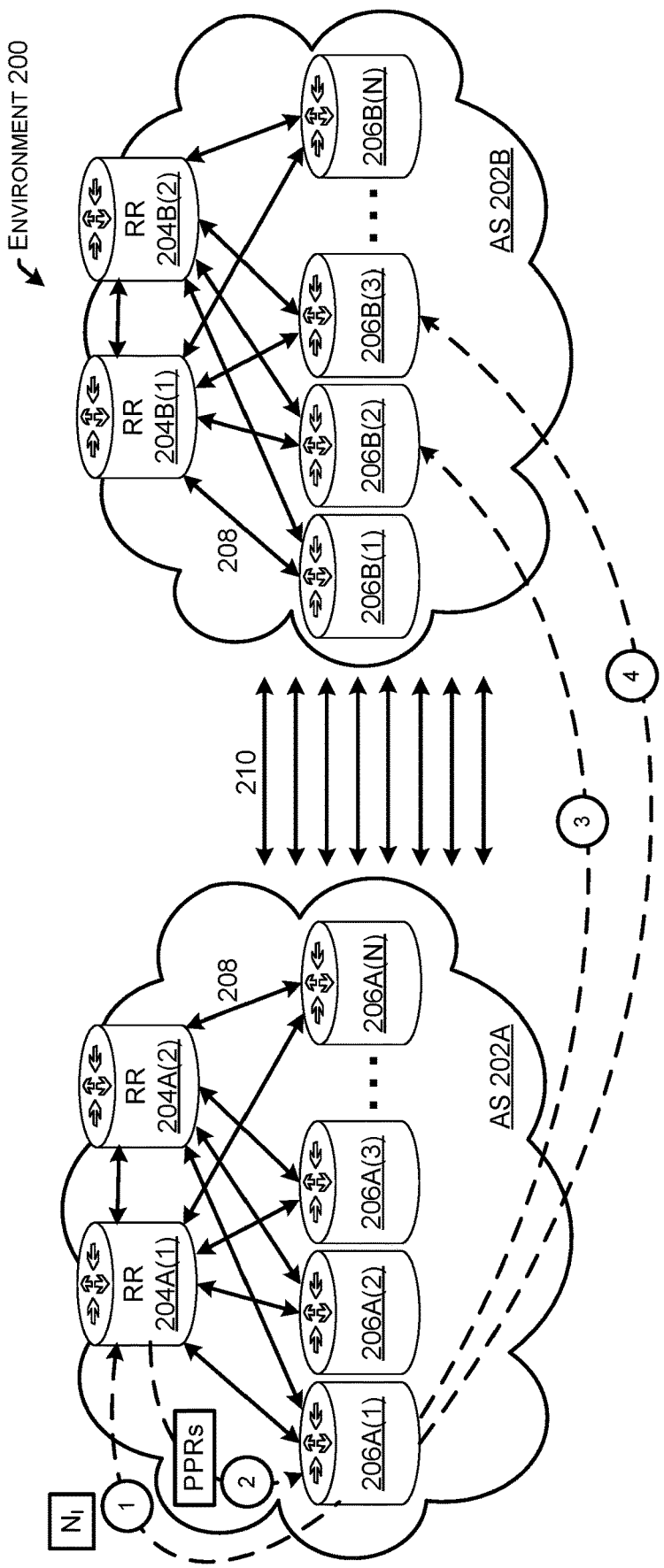
Figure 2B:
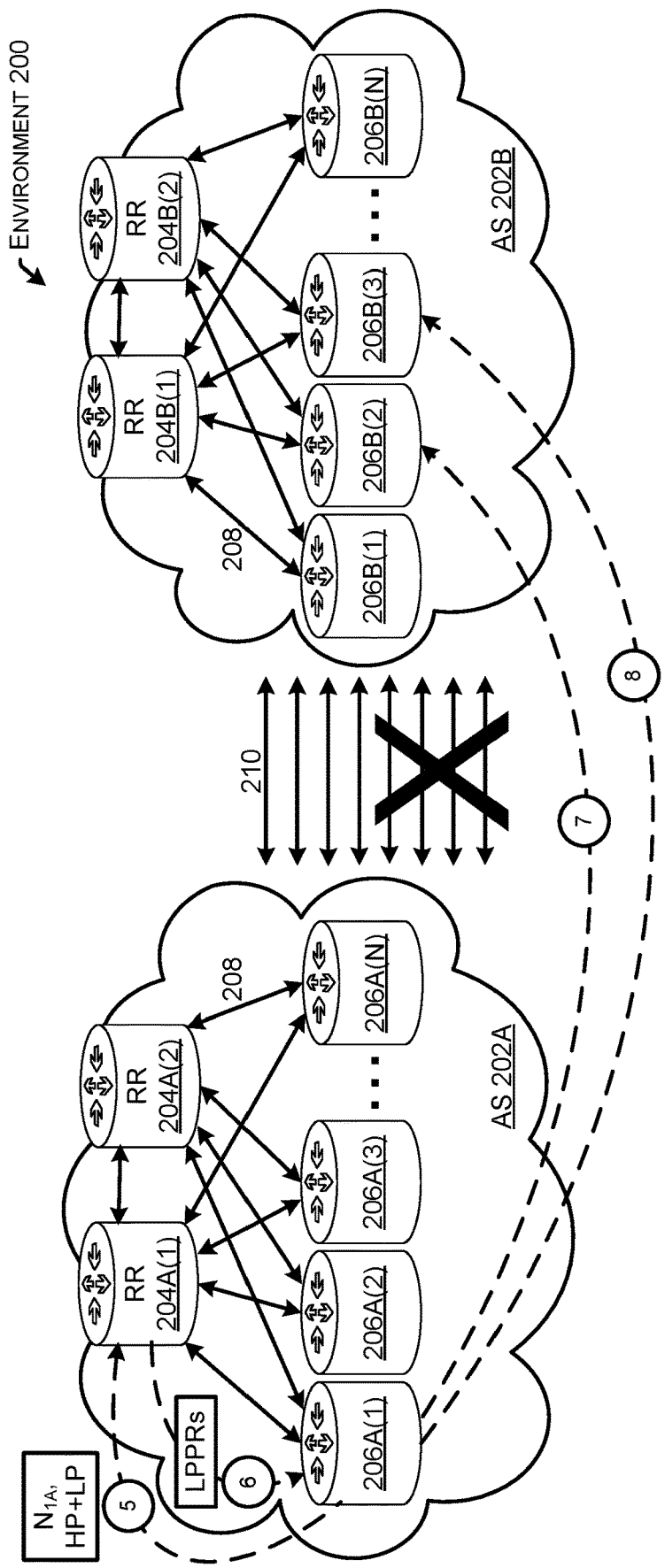
Figure 2C:
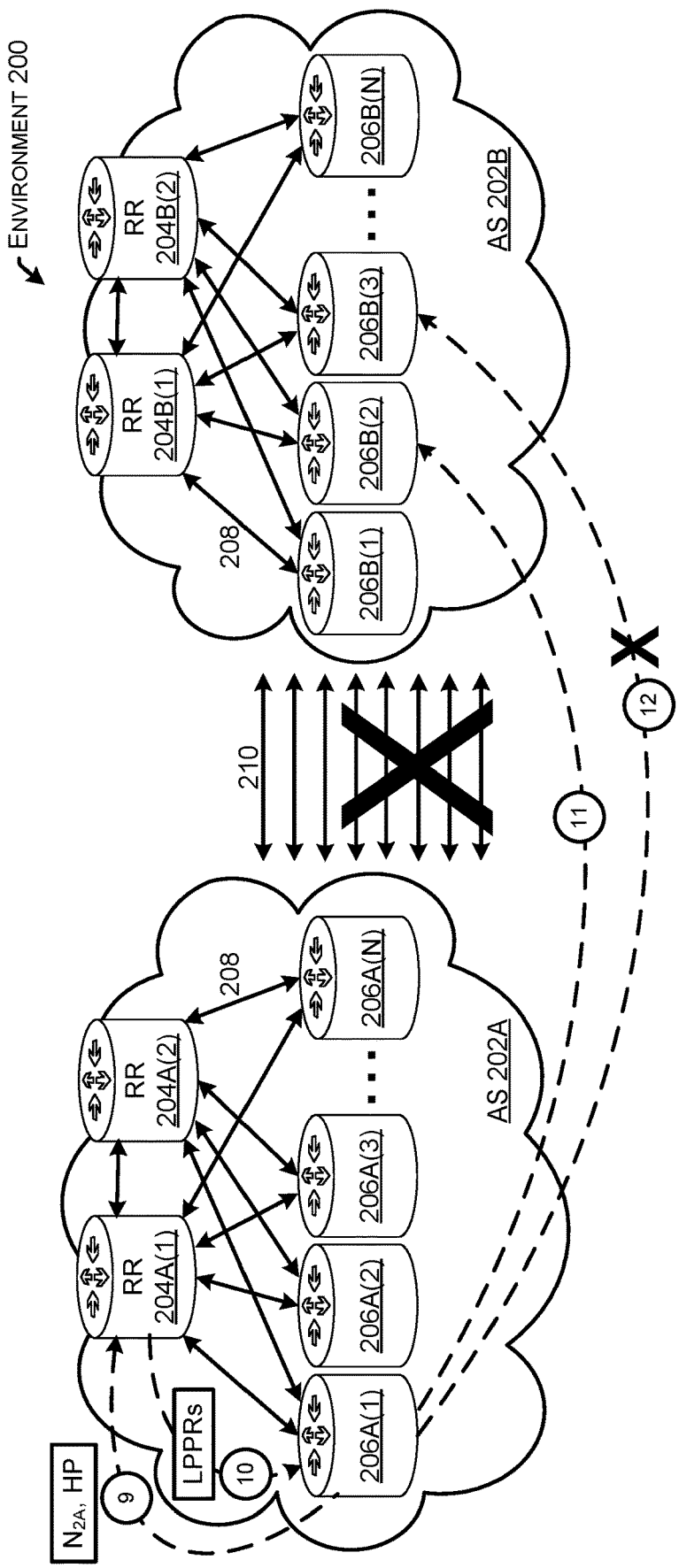

FIGS. 2A-2C collectively illustrate additional example scenarios in accordance with the present path count management concepts. FIGS. 2A-2C illustrate an example environment 200. Some aspects of the examples shown in FIGS. 2A-2C may be similar to aspects of the examples described above relative to FIGS. 1A-1D. Therefore, for sake of brevity, not all elements of FIGS. 2A-2C will be described in detail.

In the scenarios illustrated in FIGS. 2A-2C, router 206A(1) may be associated with a service provider that is providing a network service to clients via devices in AS 202B. The network service may be tiered, including relatively higher and relatively lower levels of service. For example, a relatively higher tier of service may be associated with a corresponding higher price structure paid by the client. The higher tier of service may be faster, may be less prone to delays and/or dropped packets, may include better access to load balancing and/or redundancy, and/or may include a service guarantee. For purposes of illustration, router 206B(2) is considered to be subscribed to a higher tier of service than router 206B(3), in this scenario. Stated another way, router 206B(2) is associated with a relatively higher priority client, and router 206B(3) is associated with a relatively lower priority client.

At "Step 1" in FIG. 2A, router 206A(1) may send a message signaling an initial number "$N_I$" to route reflector 204A(1), indicating a number of per prefix routes router 206A(1) wishes to receive in order to communicate with one or more prefixes. In this example, router 206A(1) wishes to communicate with router 206B(2) and router 206B(3) in AS 202B. Note that the initial number may pre-programmed and/or configured in route reflector 204A(1), rather than being sent in a message. Further, route reflector 204A(1) may be configured with initial numbers of per prefix routes (e.g., paths) specifically for each of router 206B(2) and router 206B(3), and the initial numbers for each destination may not necessarily be the same value. For instance, since router 206B(2) is associated with a higher priority client in this scenario, route reflector 204A(1) may be configured with a higher initial number of per prefix routes leading to router 206B(2) than to router 206B(3).

At "Step 2" in FIG. 2A, route reflector 204A(1) may advertise per prefix routes (PPRs) to router 206A(1). For purposes of illustration, four of the eight shown network connections 210 may correspond to pre prefix routes for router 206B(2), while four correspond to router 206B(3). At "Step 3" in FIG. 2A, router 206A(1) may send data traffic to router 206B(2) via one or more network connections 210. At "Step 4" in FIG. 2A, router 206A(1) may also send data traffic to 206B(3) via one or more network connections 210. As network operations continue, router 206A(1) may monitor memory capacity for storing per prefix routes. As long as available storage space is sufficient, no further action may be needed from router 206A(1) to continue to participate in communications with other devices in the system. However, as an overall route scale of the system increases, router 206A(1) may determine that available storage space is, or will become insufficient.

At "Step 5" in FIG. 2B, router 206A(1) may send a message signaling a first adjusted number "$N_{1A}$" to route reflector 204A(1), indicating a new, updated number of per prefix routes router 206A(1) wishes to receive in response to the low memory condition at router 206A(1). In some cases, the router 206A(1) may simply indicate the adjusted number in the message. In other cases, the router 206A(1) may also signal additional information to route reflector 204A(1). A service provider may tag different tiers of clients with different extended communities. For example, the tier of high priority clients may be associated with a separate extended community assigned to the relevant prefixes. Accordingly, router 206B(2) may be associated with a "high priority" extended community, and router 206B(3) may be associated with a "low priority" extended community. Router 206A(1) and route reflector 204A(1) may participate in a capability negotiation to ensure both devices support path count management procedures involving the messaging for an adjusted number of per prefix routes, and also messaging to support requests for per prefix routes related to particular extended communities of desired prefixes.

In the scenario illustrated in FIG. 2B, the low memory condition determined by router 206A(1) may correspond to a relatively low decrease in available storage capacity. Therefore, although the first adjusted number of per prefix routes is warranted to continue to provide the network service, router 206A(1) may still capable of serving the extended communities associated with both router 206B(2) and router 206B(3). For this reason, the message from router 206A(1) to route reflector 204A(1) requests per prefix routes for both the high priority (HP) and the low priority (LP) extended communities, in this instance. As noted above, in some cases the message may simply request the adjusted number.

At "Step 6" in FIG. 2B, route reflector 204A(1) may advertise an updated amount of per prefix routes, such as limited per prefix routes (LPPRs), to router 206A(1). Responsive to the message from router 206A(1) in Step 5, the amount of the per prefix routes may comply with the first adjusted number requested by router 206A(1) and may also include per prefix routes for both the high priority and low priority extended communities. Route reflector 204A(1) may send information regarding less available per prefix routes to router 206A(1), represented by the network connections 210 that are not marked with the "X" in FIG. 2B. In this case, three of the remaining network connections 210 correspond to router 206B(2), while one remaining network connection 210 corresponds to router 206B(3). In some cases, the lower number of per prefix routes advertised to router 206A(1) may represent no reduction in available routes for data traffic to clients associated with any particular high priority or low priority extended communities. For instance, the network connections 210 that are made unavailable may be associated with some other network service(s).

At "Step 7" in FIG. 2B, router 206A(1) may send data traffic to router 206B(2) via one or more of the available network connections 210, and at "Step 8" in FIG. 2B, router 206A(1) may also send data traffic to 206B(3) via one or more of the available network connections 210. However, as the overall scale of prefixes grows, the internal state of router 206A(1) required to store per prefix routes keeps increasing as well. While per prefix route limits may be used to contain how much state is maintained on router 206A(1), exceeding the memory capacity of router 206A(1) may result in bringing down the communication session (e.g., BGP session). Therefore, if a service provider wants to provide higher priority and/or guaranteed services to certain clients, it may not be appropriate to use per prefix route limits for those clients.

In the scenario illustrated in FIG. 2C, the low memory condition determined by router 206A(1) may correspond to more of a decrease in available storage capacity than the scenario shown in FIG. 2B. Therefore, at "Step 9" in FIG. 2C, router 206A(1) may send a message indicating a second adjusted number "$N_{2A}$" of per prefix routes to continue to provide the network service. In this scenario, the second adjusted number may be lower than the first adjusted number. Also, router 206A(1) may not be capable of continuing to serve the extended communities associated with both router 206B(2) and router 206B(3). For this reason, the message from router 206A(1) to route reflector 204A(1) requests per prefix routes for the high priority extended community, but not the low priority extended community. For instance, the router 206A(1) may be able to determine that current storage capacity is consumed with a high priority client(s), and therefore only the high priority client(s) should continue to be serviced. Alternatively, the message may simply relay the second adjusted number, and the route reflector 204A(1) may make determinations regarding which routes to advertise based on the second adjusted number and known priority information. At "Step 10" in FIG. 2B, route reflector 204A(1) may advertise limited per prefix routes (LPPRs) to router 206A(1). The amount of the per prefix routes may comply with the second adjusted number requested by router 206A(1) and may include per prefix routes for the high priority extended community, but not the low priority extended community. In this example, the second adjusted number may correspond to the three remaining network connections 210, which are associated with router 206B(2).

In response, at "Step 11" in FIG. 2C, router 206A(1) may send data traffic to router 206B(2) via one or more of the available network connections 210. However, router 206A (1) may cease sending data traffic to 206B(3), as indicated by the "X" over the dashed line at "Step 12" in FIG. 2C. In other examples, in response to decreases in available storage, router 206A(1) may request per prefix routes for the high priority (HP) extended community without necessarily lowering a previous number of requested per prefix routes. Alternatively or additionally, the route reflector 204A(1) may withdraw previously advertised per prefix routes for the low priority extended community from the router 206A(1). Similar to the scenario described above relative to FIG. 1D, withdrawing the messages depicted in Step 5 of FIG. 2B and/or in Step 9 of FIG. 2C may result in the route reflector 204A(1) advertising a previous, initial, and/or configured number of per prefix routes to router 206A(1). Here again the triggering of the message withdrawal may be manual or automatic, based on continued monitoring of available storage space at router 206A(1).

To summarize, the path count management techniques described herein may improve network performance. The techniques may be relatively lightweight, featuring low computational cost and/or low bandwidth usage. The techniques may help prevent loss of service on routers, such as bringing down a BGP session. Furthermore, the benefits of path count management techniques may be enjoyed while preserving load sharing and/or redundancy in communications between network devices.

Figure 3:
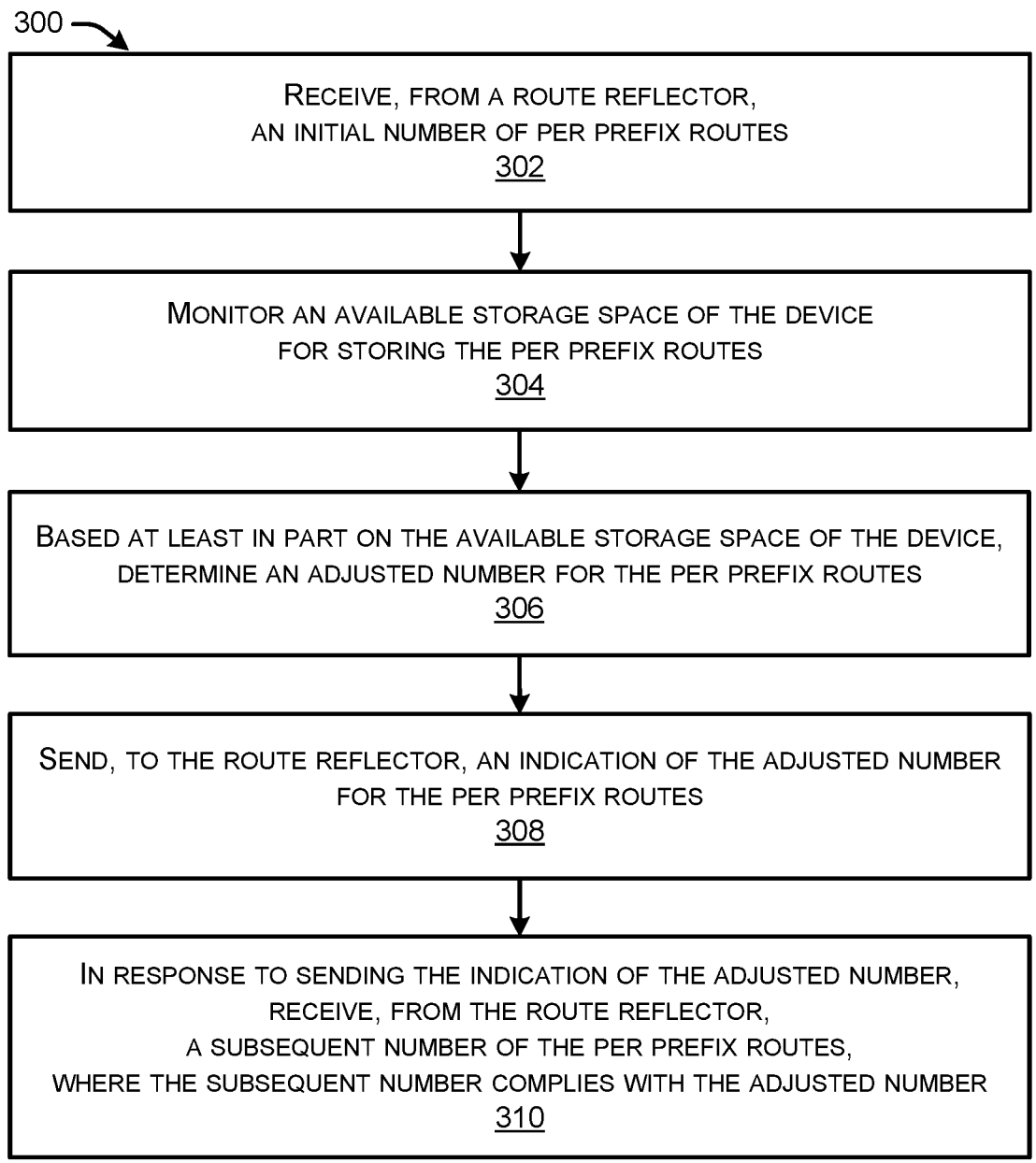
FIGS. 3 and 4 illustrate flow diagrams of example methods for the use of path count management techniques as a part of communications among network devices, in accordance with the present concepts.
Figure 4:
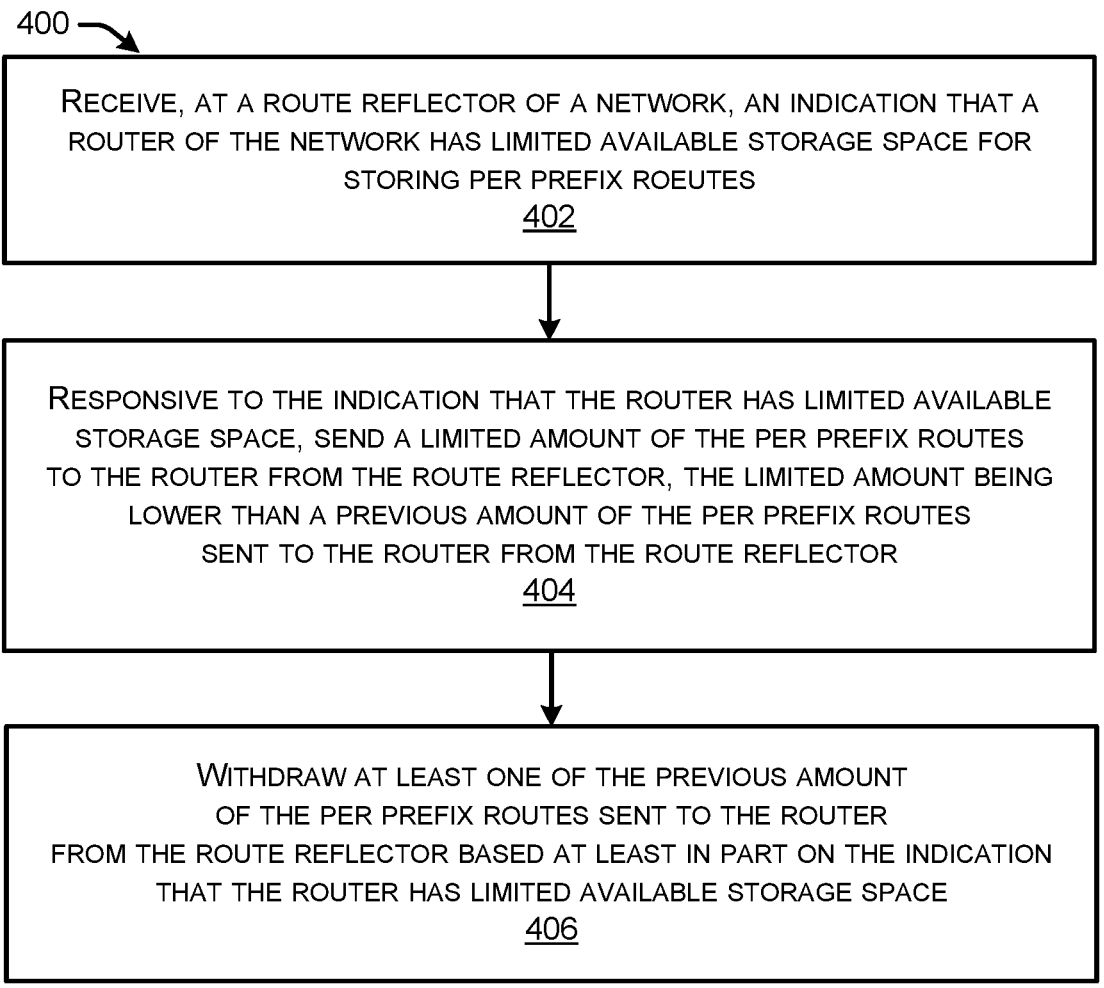

FIGS. 3 and 4 illustrate flow diagrams of example methods 300 and 400 that include functions that may be performed at least partly by a network device, such as routers (106 or 206) or route reflectors (104 or 204) described relative to FIGS. 1A-2C. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 3 and 4 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 3 illustrates a flow diagram of an example method 300 for network devices to perform path count management techniques. Method 300 may be performed by a router (e.g., router 106 or 206) communicatively coupled to a route reflector (e.g., route reflectors 104 or 204), and/or to other network devices, for instance. In some examples, method 300 may be performed by a computing device comprising one or more processors and one or more non-transitory computer-readable media storing computer-executable instructions that, when executed by the one or more processors, cause the one or more processors to perform method 300.

At 302, method 300 may include receiving, from a route reflector, an initial number of per prefix routes. In some examples, the router may be associated with a service provider and the per prefix routes comprise additional paths to a prefix for a providing service to a client.

At 304, method 300 may include monitoring an available storage space of the router for storing the per prefix routes. Method 300 may include determining that the available storage space at the router is inadequate for a path count associated with the per prefix routes, that the available storage space at the router is insufficient to continue network operations, and/or that a low memory condition exists or is approaching (e.g., imminent).

At 306, based at least in part on the available storage space of the device, method 300 may include determining an adjusted number for the per prefix routes. In some examples, the adjusted number may be determined based at least in part on lowering the initial number of the per prefix routes. The adjusted number of the per prefix routes may represent a per prefix route limit.

At 308, method 300 may include sending, to the route reflector, an indication of the adjusted number for the per prefix routes. In some examples, method 300 may include sending the indication of the adjusted number in a border gateway protocol (BGP) control plane message from the router to the route reflector.

At 310, in response to sending the indication of the adjusted number, method 300 may include receiving, from the route reflector, a subsequent number of the per prefix routes. The subsequent number may comply with the adjusted number. For example, the subsequent number may be the same or lower than the adjusted number. In some examples, method 300 may include continuing to monitor the available storage space of the device. Method 300 may further include determining an increase in the available storage space. Based at least in part on the increase in the available storage space, method 300 may include sending a withdrawal of the adjusted number to the route reflector. In response to sending the withdrawal of the adjusted number, method 300 may include receiving the initial number of the per prefix routes from the route reflector.

FIG. 4 illustrates a flow diagram of an example method 400 for network devices to perform path count management techniques. Method 400 may be performed by a route reflector (e.g., route reflectors 104 or 204) communicatively coupled to a router (e.g., router 106 or 206), for instance. In some examples, method 400 may be performed by a computing device comprising one or more processors and one or more non-transitory computer-readable media storing computer-executable instructions that, when executed by the one or more processors, cause the one or more processors to perform method 400.

At 402, method 400 may include receiving, at a route reflector of a network, an indication that a router of the network has limited available storage space for storing per prefix routes.

At 404, responsive to the indication that the router has limited available storage space, method 400 may include sending a limited amount of the per prefix routes to the router from the route reflector. In some examples, the limited amount may be lower than a previous amount of the per prefix routes sent to the router from the route reflector. Method 400 may also include selecting particular per prefix routes for the limited amount of per prefix routes. For instance, the particular per prefix routes may be selected by prioritizing service to a relatively higher priority client.

At 406, method 400 may include withdrawing at least one of the previous amount of the per prefix routes sent to the router from the route reflector. For instance, the withdrawal may be based at least in part on the indication that the router has limited available storage space. Method 400 may also include determining whether a difference between the limited amount and the previous amount is greater than a threshold. In some examples, withdrawing the at least one of the previous amount of the per prefix routes may be based at least in part on whether the difference is greater than the threshold.

Figure 5:
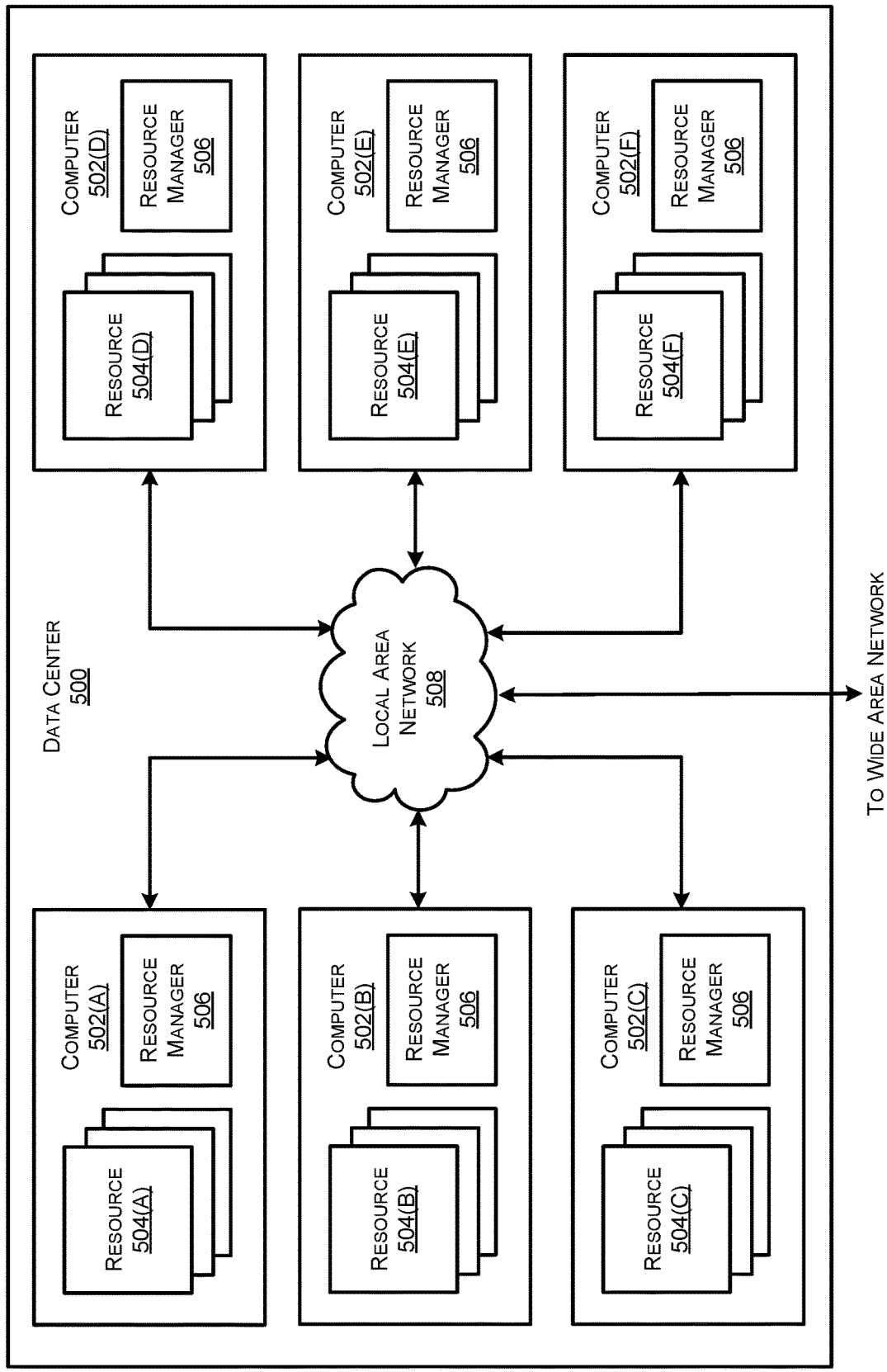
FIG. 5 illustrates a computing system diagram illustrating a configuration for a data center that can be utilized to implement aspects of the technologies disclosed herein.

FIG. 5 is a computing system diagram illustrating a configuration for a data center 500 that can be utilized to implement aspects of the technologies disclosed herein. The example data center 500 shown in FIG. 5 includes several computers 502A-502F (which might be referred to herein singularly as "a computer 502" or in the plural as "the computers 502") for providing computing resources. In some examples, the resources and/or computers 502 may include, or correspond to, any type of networked device described herein, such as a router (106 or 206) and/or route reflector (104 or 204). Although, computers 502 may comprise any type of networked device, such as servers, switches, hubs, bridges, gateways, modems, repeaters, access points, hosts, etc.

The computers 502 can be standard tower, rack-mount, or blade server computers configured appropriately for providing computing resources. In some examples, the computers 502 may provide computing resources 504 including data processing resources such as virtual machine (VM) instances or hardware computing systems, database clusters, computing clusters, storage clusters, data storage resources, database resources, networking resources, and others. Some of the computers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single computer 502. Computers 502 in the data center 500 can also be configured to provide network services and other types of services.

In the example data center 500 shown in FIG. 5, an appropriate local area network (LAN) 508 is also utilized to interconnect the computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the computers 502A-502F in each data center 500, and, potentially, between computing resources in each of the computers 502. It should be appreciated that the configuration of the data center 500 described with reference to FIG. 5 is merely illustrative and that other implementations can be utilized.

In some examples, the computers 502 may each execute one or more application containers and/or virtual machines to perform techniques described herein. For instance, the containers and/or virtual machines may serve as server devices, user devices, and/or routers in an autonomous system (102 or 202).

In some instances, the data center 500 may provide computing resources, like application containers, VM instances, and storage, on a permanent or an as-needed basis. Among other types of functionality, the computing resources provided by a cloud computing network may be utilized to implement the various services and techniques described above. The computing resources 504 provided by the cloud computing network can include various types of computing resources, such as data processing resources like application containers and VM instances, data storage resources, networking resources, data communication resources, network services, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 6.

Figure 6:
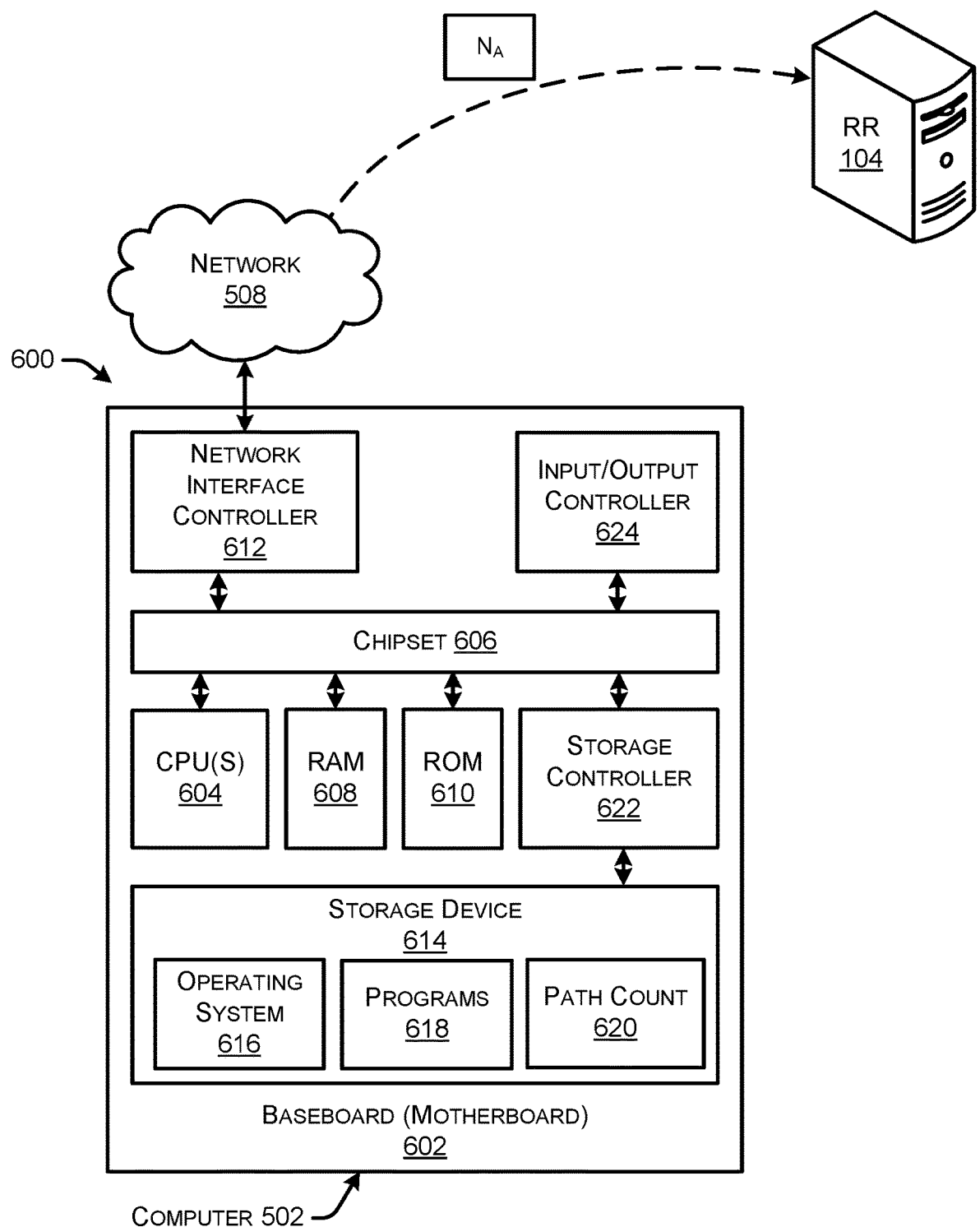
FIG. 6 is a computer architecture diagram showing an illustrative computer hardware architecture for implementing a device that can be utilized to implement aspects of the various technologies presented herein.

FIG. 6 shows an example computer architecture 600 for a computer 502 capable of executing program components for implementing the functionality described above. The computer architecture 600 shown in FIG. 6 illustrates a conventional server computer, workstation, desktop computer, laptop, tablet, network appliance, e-reader, smartphone, and/or other computing device, and can be utilized to execute any of the software components presented herein. The computer 502 may, in some examples, correspond to a physical device described herein (e.g., router, route reflector, etc.), and may comprise networked devices such as servers, switches, routers, hubs, bridges, gateways, modems, repeaters, access points, etc. For instance, computer 502 may correspond to router 106 or 206.

As shown in FIG. 6, the computer 502 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 502.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 502. The chipset 606 can further provide an interface to a computer-readable storage medium such as a read-only memory ("ROM") 610 or non-volatile RAM ("NVRAM") for storing basic routines that help to startup the computer 502 and to transfer information between the various components and devices. The ROM 610 or NVRAM can also store other software components necessary for the operation of the computer 502 in accordance with the configurations described herein.

The computer 502 can operate in a networked environment using logical connections to remote computing devices and computer systems through a network, such as the network 508 (and/or via network connections 108, 110, 208, or 210). The chipset 606 can include functionality for providing network connectivity through a network interface controller (NIC) 612, such as a gigabit Ethernet adapter. The NIC 612 is capable of connecting the computer 502 to other computing devices over the network 508. For instance, in the example shown in FIG. 6, NIC 612 may help facilitate transfer of data, packets, and/or communications, such as a message including an adjusted number "$N_A$," over the network 508 with a route reflector 104. It should be appreciated that multiple NICs 612 can be present in the computer 502, connecting the computer to other types of networks and remote computer systems.

The computer 502 can be connected to a storage device 614 that provides non-volatile storage for the computer. The storage device 614 can store an operating system 616, programs 618, a path count 620 (e.g., per prefix route information), and/or other data. The storage device 614 can be connected to the computer 502 through a storage controller 622 connected to the chipset 606, for example. The storage device 614 can consist of one or more physical storage units. The storage controller 622 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 502 can store data on the storage device 614 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 614 is characterized as primary or secondary storage, and the like.

For example, the computer 502 can store information to the storage device 614 by issuing instructions through the storage controller 622 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 502 can further read information from the storage device 614 by detecting the physical states or characteristics of one or more particular locations within the physical storage units.

In addition to the mass storage device 614 described above, the computer 502 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 502. In some examples, the operations performed by the network 508, and or any components included therein, may be supported by one or more devices similar to computer 502. Stated otherwise, some or all of the operations performed by the network 508, and or any components included therein, may be performed by one or more computer devices 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 614 can store an operating system 616 utilized to control the operation of the computer 502. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 614 can store other system or application programs and data utilized by the computer 502.

In one embodiment, the storage device 614 or other computer-readable storage media is encoded with computer-executable instructions which, when loaded into the computer 502, transform the computer from a general-purpose computing system into a special-purpose computer capable of implementing the embodiments described herein. These computer-executable instructions transform the computer 502 by specifying how the CPUs 604 transition between states, as described above. According to one embodiment, the computer 502 has access to computer-readable storage media storing computer-executable instructions which, when executed by the computer 502, perform the various processes described above with regard to FIGS. 1A-4. The computer 502 can also include computer-readable storage media having instructions stored thereupon for performing any of the other computer-implemented operations described herein.

The computer 502 can also include one or more input/output controllers 624 for receiving and processing input from a number of input devices, such as a keyboard, a mouse, a touchpad, a touch screen, an electronic stylus, or other type of input device. Similarly, an input/output controller 624 can provide output to a display, such as a computer monitor, a flat-panel display, a digital projector, a printer, or other type of output device. It will be appreciated that the computer 502 might not include all of the components shown in FIG. 6, can include other components that are not explicitly shown in FIG. 6, or might utilize an architecture completely different than that shown in FIG. 6.

As described herein, the computer 502 may comprise one or more devices, such as routers 106 or 206, route reflectors 104 or 204, and/or other devices. The computer 502 may include one or more hardware processors 604 (processors) configured to execute one or more stored instructions. The processor(s) 604 may comprise one or more cores. Further, the computer 502 may include one or more network interfaces configured to provide communications between the computer 502 and other devices, such as the communications described herein as being performed by routers 106 or 206 and route reflectors 104 or 204, and/or other devices. In some examples, the communications may include data, packets, messages, updates, withdrawals, per prefix routes, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 618 may comprise any type of programs or processes to perform the techniques described in this disclosure in accordance with path count management techniques. For instance, the programs 618 may cause the computer 502 to perform techniques for communicating with other devices using any type of protocol or standard usable for determining connectivity. Additionally, the programs 618 may comprise instructions that cause the computer 502 to perform the specific techniques for path count management.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A device comprising:
one or more processors; and
one or more non-transitory computer-readable media storing computer-executable instructions that, when executed by the one or more processors, cause the one or more processors to:
receive, from a route reflector, an initial number of per prefix routes;
monitor an available storage space of the device for adequate storage capacity for storing the per prefix routes;
based at least in part on the available storage space of the device, determine an adjusted number for the per prefix routes;
send, to the route reflector, an indication of the adjusted number for the per prefix routes; and
in response to sending the indication of the adjusted number, receive, from the route reflector, a subsequent number of the per prefix routes, where the subsequent number complies with the adjusted number.

2. The device of claim 1, wherein the device is associated with a service provider and the per prefix routes comprise additional paths to a prefix for a providing service to a client.

3. The device of claim 1, wherein the computer-executable instructions further cause the one or more processors to:
determine that the available storage space of the device is inadequate for a path count associated with the per prefix routes,
wherein the adjusted number is determined based at least in part on lowering the initial number of the per prefix routes.

4. The device of claim 1, wherein the adjusted number of the per prefix routes represents a per prefix route limit.

5. The device of claim 4, wherein the subsequent number has a same value or a lower value than the adjusted number.

6. The device of claim 1, wherein the computer-executable instructions further cause the one or more processors to:
continue to monitor the available storage space of the device;
determine an increase in the available storage space; and
based at least in part on the increase in the available storage space, send a withdrawal of the adjusted number to the route reflector.

7. The device of claim 6, wherein the computer-executable instructions further cause the one or more processors to:
in response to sending the withdrawal of the adjusted number, receive the initial number of the per prefix routes from the route reflector.

8. The device of claim 1, wherein the computer-executable instructions further cause the one or more processors to:
send the indication of the adjusted number in a border gateway protocol (BGP) control plane message to the route reflector.

9. A computer-implemented method comprising:
receiving, at a router and from a route reflector, an initial number of per prefix routes;
monitoring an available storage space of the router for adequate storage capacity for storing the per prefix routes;
based at least in part on the available storage space of the router, determining an adjusted number for the per prefix routes;
sending, to the route reflector, an indication of the adjusted number for the per prefix routes; and
in response to sending the indication of the adjusted number, receiving, from the route reflector, a subsequent number of the per prefix routes, where the subsequent number complies with the adjusted number.

10. The computer-implemented method of claim 9, wherein the router is associated with a service provider and the per prefix routes comprise additional paths to a prefix for a providing service to a client.

11. The computer-implemented method of claim 10, wherein the subsequent number has a same value or a lower value than the adjusted number.

12. The computer-implemented method of claim 9, further comprising:
determining that the available storage space of the router is inadequate for a path count associated with the per prefix routes,
wherein the adjusted number is determined based at least in part on lowering the initial number of the per prefix routes.

13. The computer-implemented method of claim 9, wherein the adjusted number of the per prefix routes represents a per prefix route limit.

14. The computer-implemented method of claim 9, further comprising:
continuing to monitor the available storage space of the router;
determining an increase in the available storage space; and
based at least in part on the increase in the available storage space of the router, sending a withdrawal of the adjusted number to the route reflector.

15. The computer-implemented method of claim 14, further comprising:
in response to sending the withdrawal of the adjusted number, receiving the initial number of the per prefix routes from the route reflector.

16. The computer-implemented method of claim 9, further comprising:
sending the indication of the adjusted number in a border gateway protocol (BGP) control plane message from the router to the route reflector.

17. A computer-implemented method comprising:
receiving, at a route reflector of a network, an indication that a router of the network has limited available storage space for storing per prefix routes, the indication including an adjusted number for the per prefix routes based at least in part on the available storage space, the indication determined from monitoring of the available storage space of the router for adequate storage capacity for the per prefix routes; and
responsive to the indication that the router has limited available storage space, sending a limited amount of the per prefix routes to the router from the route reflector, the limited amount complying with the adjusted number.

18. The computer-implemented method of claim 17, further comprising:
withdrawing at least one of a previous amount of the per prefix routes sent to the router from the route reflector based at least in part on the indication that the router has limited available storage space.

19. The computer-implemented method of claim 18, further comprising:
determining whether a difference between the limited amount and the previous amount is greater than a threshold,
wherein the withdrawing the at least one of the previous amount of the per prefix routes is based at least in part on whether the difference is greater than the threshold.

20. The computer-implemented method of claim 17, further comprising:
selecting particular per prefix routes for the limited amount of per prefix routes by prioritizing service to a relatively higher tier client.

* * * * *